(12) United States Patent
Pepper

(10) Patent No.: US 7,027,161 B2
(45) Date of Patent: Apr. 11, 2006

(54) ADAPTIVE OPTICAL SYSTEM WITH SELF-REFERENCING CONTRAST CONTROL

(75) Inventor: David M. Pepper, Malibu, CA (US)

(73) Assignee: HRL Laboratories, LLC, Malibu, CA (US)

( * ) Notice: Subject to any disclaimer, the term of this patent is extended or adjusted under 35 U.S.C. 154(b) by 303 days.

(21) Appl. No.: 10/329,900

(22) Filed: Dec. 26, 2002

(65) Prior Publication Data
US 2004/0125380 A1 Jul. 1, 2004

(51) Int. Cl.
*G01B 9/02* (2006.01)

(52) U.S. Cl. ...................................... 356/450

(58) Field of Classification Search ............... 356/450, 356/491, 495, 511, 512, 521
See application file for complete search history.

(56) References Cited

U.S. PATENT DOCUMENTS

| | | | |
|---|---|---|---|
| 4,682,025 A | 7/1987 | Livingston et al. | 250/201 |
| 4,833,314 A | 5/1989 | Pepper et al. | 250/201 |
| 4,865,454 A | 9/1989 | Lazzarini et al. | 356/359 |
| 5,046,824 A | 9/1991 | Pepper | 359/72 |
| 5,048,935 A | 9/1991 | Efron et al. | 359/36 |
| 5,225,920 A * | 7/1993 | Kasazumi et al. | 349/1 |
| 5,317,435 A * | 5/1994 | Kasazumi et al. | 349/2 |
| 5,555,128 A | 9/1996 | Khoury et al. | 359/559 |
| 5,751,475 A | 5/1998 | Ishiwata et al. | 359/387 |
| 6,163,381 A | 12/2000 | Davies et al. | 356/521 |

OTHER PUBLICATIONS

Efron, Uzi, *Spatial Light Modulator Technology: Materials, Devices, and Applications*, Marcel Dekker, Inc., New York, pp 619, 622-643 (1995).

Gaeta, C.J., et al., "Characteristics of Innovative Adaptive-Optics Servos that Use Membrane-Based Spatial Light Modulators," *J. Opt. Soc. Am. A*, vol. 11, No. 2, pp 880-894 (Feb. 1994).

Mitchell, P.V., et al., "Single-Pixel Demonstration of Innovative Adaptive Optics by Use of a Charge-Transfer Membrane Light Modulator," *Optics Letters*, vol. 18, No. 20, pp 1748-1750 (Oct. 15, 1993).

Shirai, T., et al., "Adaptive Wave-Front Correction by Means of All-Optical Feedback Interferometry," *Optics Letters*, vol. 25, No. 11, pp 773-775 (Jun. 1, 2000).

(Continued)

*Primary Examiner*—Gregory J. Toatley
*Assistant Examiner*—Michael A. Lyons
(74) *Attorney, Agent, or Firm*—Ladas & Parry LLP

(57) ABSTRACT

A system for wavefront aberration reduction of an incident optical beam. The system includes a spatial light modulator (SLM) for receiving the incident optical beam and forming an output optical beam. The output beam is aberration-reduced compared to the incident beam. An interferometer receives a portion of the output optical beam and generates an interference fringe pattern by introducing a phase shift to one part of the portion of the output optical beam, the interference fringe pattern being applied to the SLM. The interference fringe pattern is representative of the wavefront error of the incident optical beam and the interference fringe pattern activates the SLM such that the SLM performs wavefront error correction on the output optical beam.

30 Claims, 5 Drawing Sheets

OTHER PUBLICATIONS

Fisher, A.D., "Self-Referenced High Resolution Adaptive Wavefront Estimation And Compensation," *Adaptive Optics*, vol. 551, pp. 102-112 (Apr. 10-11, 1985).

Ma, S., et al., "Atmospheric-Turbulence Compensation With Self-Referenced Binary Holographic Interferometry," *Journal of the Optical Society of America*, vol. 11, No. 1, pp. 428-433 (Jan. 1994).

* cited by examiner

ADAPTIVE OPTICAL SYSTEM WITH SELF-REFERENCING CONTRAST CONTROL

TECHNICAL FIELD

This disclosure relates to the field of closed-loop adaptive optical systems, and in particular, to sensing and correcting wavefront errors.

BACKGROUND OF THE INVENTION

The prior art includes closed-loop adaptive optical systems which use conventional adaptive optical approaches such as deformable mirrors, wavefront error sensors (WESs), drive electronics and processors with N servo-loops, where N equals the number of resolvable pixels to be controlled. The number of resolvable pixels to be controlled may be on the order of a few hundred to over ten thousand.

Another approach to closed-loop systems includes an optical scheme to replace the N hard-wired servo-loops, and exploits a spatial light modulator (SLM) in an all-optical closed-loop configuration (U.S. Pat. No. 5,046,824; D. M. Pepper). In this system, a local reference beam is required that is coherent with respect to an incoming aberrated beam. The local reference beam coherently combines with the input beam to form a spatial interference pattern that is applied to and thereby activates the SLM. The generation of the local reference beam is rather challenging and it thus complicates the system architecture. For example, the local reference beam may be generated by spatially filtering a part of the incoming beam, phase shifting this spatially filtered beam (for quadrature interference), and then recombining it interferometrically with the incident beam to form the necessary fringe pattern.

Another approach involves sampling a diffraction-limited sub-aperture of the incoming beam (possibly amplifying a single speckle), phase shifting it, and then interfering it with the remainder of the incoming aberrated beam.

Yet another approach is to phase-lock a local oscillator to the incoming distorted beam.

Yet another approach employs a radial shearing method, whereby a sub-aperture of large wavefront radius is used as the local reference. However, this approach is very inefficient in terms of processing the incoming photons and, in addition, limits the spatial frequency compensation capability of the adaptive optical system.

The above examples all suffer from a relatively low photon efficiency. Moreover, since a common path is not used for the interfering beams, the system is sensitive to vibrations, and further, a long coherence length source is needed for the aberrated beam with a coherence length greater than any path difference in the system.

An example of an adaptive optical closed-loop system of the prior art is shown in FIG. 1. This prior art system includes a spatial light modulator (SLM) 1, which functions as an integrated wavefront error sensor and spatial phase modulator in a monolithic package. The SLM 1 may be a liquid crystal light valve, a MEMS-based device, etc. The SLM 1 is a two-port device, whose basic function is to transfer an input intensity pattern at an input port 2 (in the form of an image, an interference pattern, etc.) into an output optical phase map. The input port 2 of SLM 1 typically consists of a photoconductive surface 2 with spatially resolvable (e.g., pixelated) channels, whereas the output port 3 consists of an optically addressable array of optical phase shifters (e.g., a liquid crystal thin film, an array of MEMS membranes, an array of electro-optic phase shifters, etc.). The SLM 1 may be configured in a reflection or transmission architecture—a reflection architecture is shown in FIG. 1 and the other figures. Typically, a high resolution imaging system (not shown) is associated with the SLM 1, which imaging system is used to address the two ports of the SLM 1. The imaging system may include a monolithic microlenslet array as a means by which to address the output port 3 (for minimal phase curvature and distortion), since, typically, piston-only corrections are required. Then, a multilens systems is preferably used to provide a one-to-one imaging of the output port 3 of the SLM 1 to its input port 2 so that all resolvable pixels of the wavefront beam are mapped from the front to the back side of the SLM 1. Typically, a non-inverting, unity magnification, flat-field three-element telecentric imaging system is employed to provide for this system need. These imaging system details are known to those skilled in the art and thus for the sake of brevity, are not discussed in further detail here.

The reader is directed to the following references for additional information regarding SLM's and this area of technology:

(1) "Spatial Light Modulator Technology—Materials, devices and Applications", edited by Uzi Efron, Marcel Dekker, Inc. publisher, pp 619–643, the disclosure of which is hereby incorporated wherein by reference;

(2) "Single-pixel demonstration of innovative adaptive optics by use of a charge-transfer membrane light modulator", by P. V. Mitchell et al., Optic Letters, vol. 18, no. 20, Oct. 15, 1993, pp 1748–1750, the disclosure of which is hereby incorporated wherein by reference; and (3) Characteristics of innovative adaptive-optics that use membrane-based spatial light modulators", C. J. Gaeta et al., J. Opt. Soc. Am. A, Vol. 11, No. 2, February 1994, pp 880–894, the disclosure of which is hereby incorporated wherein by reference.

The object of the prior art system of FIG. 1 is to scrub wavefront distortion which has occurred to a beam 15 due to it having passed through a region 14 which imposed the wavefront distortion on beam 15, the distorted beam being identified by numeral 4 in the figures as it exits region 14. The system of FIG. 1 receives an input field, such as the wavefront-distorted (aberrated) beam 4, and generates, in real-time, a "scrubbed" output beam 5, which is relatively free of aberrations compared to the distorted input beam 4 (the amount by which the beam is scrubbed will depend on the effective gain and dynamic range of SLM 1). The distorted input beam 4 is referred to as the external reference, since it references the external distortions 14 that need to be corrected. Examples of path aberrations/distortions 14 include the effects of propagation through a turbulent atmosphere, a turbid liquid, a multimode optical fiber, an optical amplifier, etc. As a result of the adaptive optical processing by the system, the aberrated input beam 4 is stripped of most of its phase distortions, and emerges as a relatively clean plane wave 5 with minimal loss of photons. The operation of this system is referred to as "wavefront scrubbing."

In addition to wavefront scrubbing, the system can also be used to generate a phase-conjugate replica 11 (a wavefront-reversed and aberration-reversed beam) of a readout beam 6. In this case, the same architecture may be used, but, in addition, a plane wave readout beam 6 is directed into the reverse direction of the scrubbed output beam 5, as shown in FIG. 1. After reflection by the SLM 1, the readout beam 6 emerges as a phase-conjugate replica 11 of the input beam 4 and, therefore, "undoes" the initial distortions imposed on the input beam 4 by region 14 when transiting through the same (but in a reciprocal direction) aberrated path 14, and it emerges from region 14 as an aberration-reduced output beam 12.

In general, the adaptive optical system senses the wavefront distortion of the input beam 4 by sampling a portion of the external reference beam 8, using, for example, a beam splitter 7 preferably just after the SLM 1. This sampled external reference 8, which has some residual aberrations from region 14 since the scrubbing is not 100% effective, is then directed to the backside of the SLM (to the photoconductive input port 2), where it interferometrically combines with a coherent non-aberrated beam referred to as a local reference beam 9. The resultant interference pattern is an intensity mapping of the phase distortion of the external reference 8 relative to the local reference 9. Note that the local reference beam 9 is typically a plane wave. In general, upon convergence, the servo aspect of the adaptive optical system of FIG. 1 results in a corrected output beam 5 that possesses the same phasefront as that of the local reference beam 9 (limited by the open-loop gain and dynamic range of the servo system and particularly of SLM 1). In order for this system to properly function, the local reference beam 9 is phase-shifted relative to the external reference beam 8 by preferably 90 degrees so that this pair of reference beams 8, 9 are preferably in quadrature and optimal convergence of the servo loop is achieved. Phase shifter 10 imposes a 90 degree phase shift on the local reference beam 9. Note that this phase shift is the only operation required by an outside processor to enable the system to function. Thus, a single servo-control will, in essence, provide sufficient information for millions (for example) of equivalent adaptive optical piston actuators (the output pixels of the SLM) to properly set the phasefront across the device for compensation of the wavefront distortions of the input beam 4. This system has been demonstrated to be capable of providing wavefront compensation of distorted laser beams. Note that, in the case of laser beams, a separate coherent source is used for the local reference beam 9, the coherence length of which is sufficient so as to enable the pair of reference beams 8, 9 to form an interference pattern of high fringe contrast on the photoconductive port 2 of SLM 1.

The local reference beam 9 may, in principle, be generated by beam splitting part of the external reference beam 8 and spatially filtering it using a conventional pinhole 20 with an amplitude stop of fixed diameter, as shown in FIG. 2. This approach is referred to as "self-referencing", since the local reference beam 9 is derived from the external reference beam 8 itself. In this case, a spatial filter 20 with an amplitude-stop fixed diameter pinhole is used, and a downstream optical phase shifter 10 is used for quadrature operation of the interferometer (basically, a Mach-Zehnder interferometer 16 with one beam being a plane wave and the other beam possessing many spatial modes—Mach-Zehnder interferometers 16 typically have two legs which cause an interference pattern, with one of the legs having a phase shifter 10 therein). The resultant output interference fringe pattern is then imaged onto the input port 2 of SLM 1.

The performance of such prior art systems generally suffer from the following limitations:

(1) A separate path is required for the generation of the local reference, which can lead to vibration-induced or thermally induced degradation of the system (the interferometric legs of the prior art systems must be maintained with a precision of a fraction of a wavelength (approximately $\lambda/10$) in path-length-differential to assure quadrature operation);

(2) Since photons are lost in the spatial filtering operation of FIG. 2, that system is not photon efficient and suffers from significant losses;

(3) The added path length dictates the need for a laser or an optical source whose coherence length exceeds the path-length differences in the Mach-Zehnder interferometer (path length differences between the two interfering beams 8, 9); and (4) The fact that the pinhole embodiment (FIG. 2) has a fixed diameter can lead to a degradation in performance. (It is to be noted that in accordance with one aspect of the present invention, the system may employ an amplitude pinhole with a variable diameter. In this case, the system has been shown, in simulations, to improve the convergence performance and dynamics (response time and Strehl ratio) of the closed-loop system.)

The prior art further teaches that a coherent local reference 9 may be generated by expanding (i.e., magnifying) part of the external reference beam 8 so that a fraction of the magnified wavefront is nearly planar (a portion of a spherical wave is nearly planar when the radius of the spherical wave becomes large as a result of magnifying the beam). This approach is discussed in the Jun. 1, 2000 issue of Optics Letters (Vol 25, No. 11).

However, when using this approach, the performance of the system is compromised for reasons which include the following:

(1) Only a small fraction of the photons is utilized, resulting in a loss of performance;

(2) Low order spatial frequencies are not processed, thereby limiting the spatial bandwidth of the system and resulting in a non-planar converged wavefront; and (3) Controlling the phase of the beams to realize quadrature of the external and local reference beams is not addressed in this approach. This limits the performance of the system as well as its robustness with respect to vibrations and other noise sources, as well as the need for a long coherence-length source, since the feedback-loop interferometer is not a common-path interferometer (as is utilized in the embodiments disclosed herein).

BRIEF DISCUSSION OF THE PRESENT INVENTION AND CERTAIN OF ITS FEATURES AND ADVANTAGES

The present invention preferably uses a white-light interferometer (of the Zernike phase contrast class) to generate the interference pattern which activates the SLM for wavefront correction of the input beam. This white-light interferometer may have a fixed structure or may have a controllable phase-stop (see U.S. Pat. No. 4,833,314 to Pepper et al and U.S. Pat. No. 5,751,475 to Ishiwata et al., the disclosures of which are hereby incorporated herein by reference), and preferably uses a single control algorithm. The phrase "single control algorithm" is meant to indicate that one parameter can control the diameter of the phase-stop, as opposed to a set of controls, with each one sequentially opening or closing the phase-stop diameter, which is also taught by the Pepper patent.

In another embodiment, a simple control voltage can be used to control the phase-stop diameter as opposed to multiple voltage controls.

In either case, the overall closed-loop adaptive optics system can utilize a single control algorithm to vary the phase-stop diameter. However, multiple parametric control is also disclosed.

The present invention is more photon efficient than systems of the prior art as the disclosed feedback control loop utilizes most photons in the feedback beam, and thus is capable of accommodating sources with low input power levels as well as with poor spatial and spectral coherence (i.e., "white-light" sources with very short coherence lengths).

Further, in one embodiment of the white-light interferometer of the present invention, the phase stop of the system is variable (e.g., variable diameter) which optimizes the performance of the system, both temporally (convergence time) and spatially (Strehl ratio), as well as the phase shift of the phase stop itself (although it is believed that a phase-stop of 90° is likely optimum).

Applications of the present invention include but are not limited to:

laser communications systems (where diffraction-limited signal beams are required for optimal heterodyne or homodyne detection);

beam clean-up for scaled-up laser systems, beam combining, optical interconnects, nonlinear optical mixing, applications where a plane wave is required for high efficiency wave mixing;

compensated imaging systems (to view distant objects through turbulent atmospheres);

remote sensing (including laser ultrasound sensing and enhanced vibrometry);

optical fiber imaging and beam delivery systems (for multi-mode fibers);

Some of the advantages of the present invention over the prior art include, but are not limited to the following:

An adaptive optical system can be realized without the need for complicated wavefront error sensors and associated computationally intensive reconstruction algorithms.

The required coherent reference is preferably generated from the incident beam itself, and no additional coherent local reference beam is needed.

The wavefront error sensing is accomplished interferometrically using a compact, common-path interferometer, which is robust, vibration tolerant, and capable of generating white-light fringe patterns (via the aberrated input beam).

An optional single feedback controller is all that is required to provide the necessary control of over a large number (on the order of a million) of equivalent piston actuators. This optional feedback controller is preferably used if it is desired to control the characteristics (fringe visibility, wavefront quality, etc.) of the common-path interferometer as the system converges.

BRIEF DESCRIPTION OF THE PRESENT INVENTION

In accordance with the present invention, a novel white-light compatible interferometer is used in conjunction with a spatial light modulator (SLM), to form a robust adaptive optical compensation system. The disclosed white-light compatible interferometer may be used with lasers, but it may also be used with LEDs, spectral lamp sources and other classes of incoherent lamps and light sources having an effective coherence length only on the order of microns or greater.

In the system and method of the present invention, a portion of the input beam impinging on the system is diverted to the white-light interferometer for wavefront error sensing. From the diverted portion of the input beam, the white-light interferometer generates an interference fringe pattern representative of the wavefront distortions of the input beam, and the fringe pattern in turn activates the SLM which applies the appropriate wavefront corrections to the input beam.

In another aspect of the present invention, an optional feedback controller may be used to control the white-light compatible interferometer and optimize its performance.

Embodiments of the present invention with either Mach-Zehnder (or modified Mach-Zehnder) or common path interferometers are disclosed.

The combination of a white-light compatible interferometer and SLM, supplemented with an optional servo controller, form a compact and robust adaptive optical system, capable of providing wavefront correction of spectrally broadband sources (i.e., white light compensation). Further, an adaptive optical system with an equivalent million piston actuators can be realized using a single servo-control loop, with the number of equivalent piston actuators being dictated by the number of resolvable wavefront "coherent patches", or spatial modes that characterize the wavefront distortion, as well as by signal-to-noise considerations (such as shot noise limitations, etc.).

DETAILED DESCRIPTION

Figure 1:
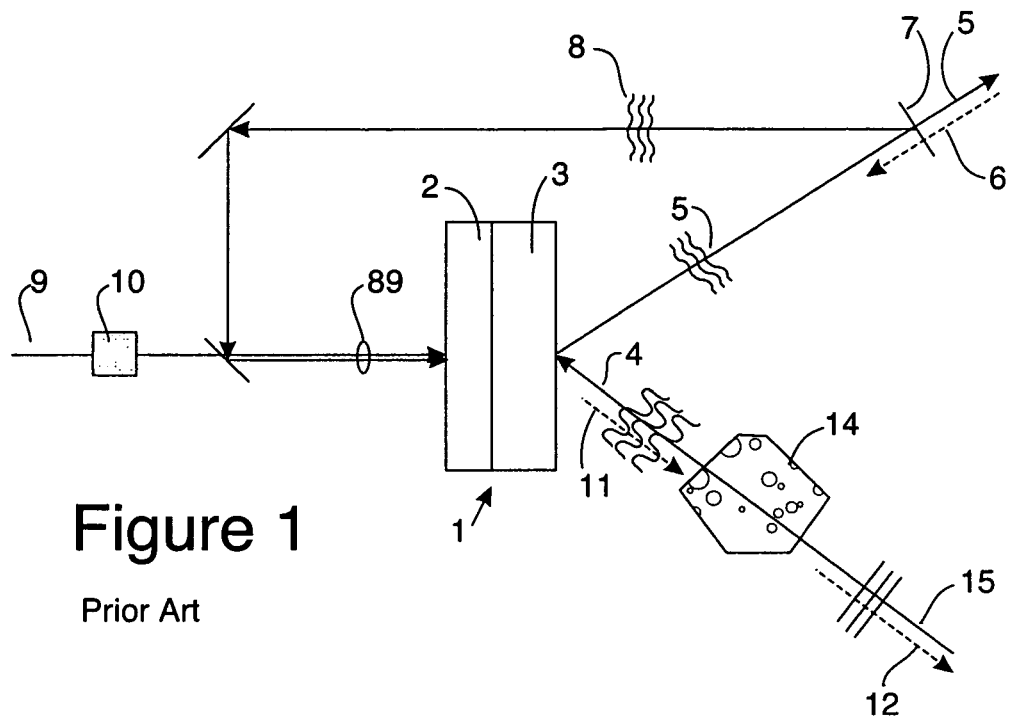
FIG. 1 is a schematic diagram of an example of an adaptive optical closed-loop system of the prior art.
Figure 2:
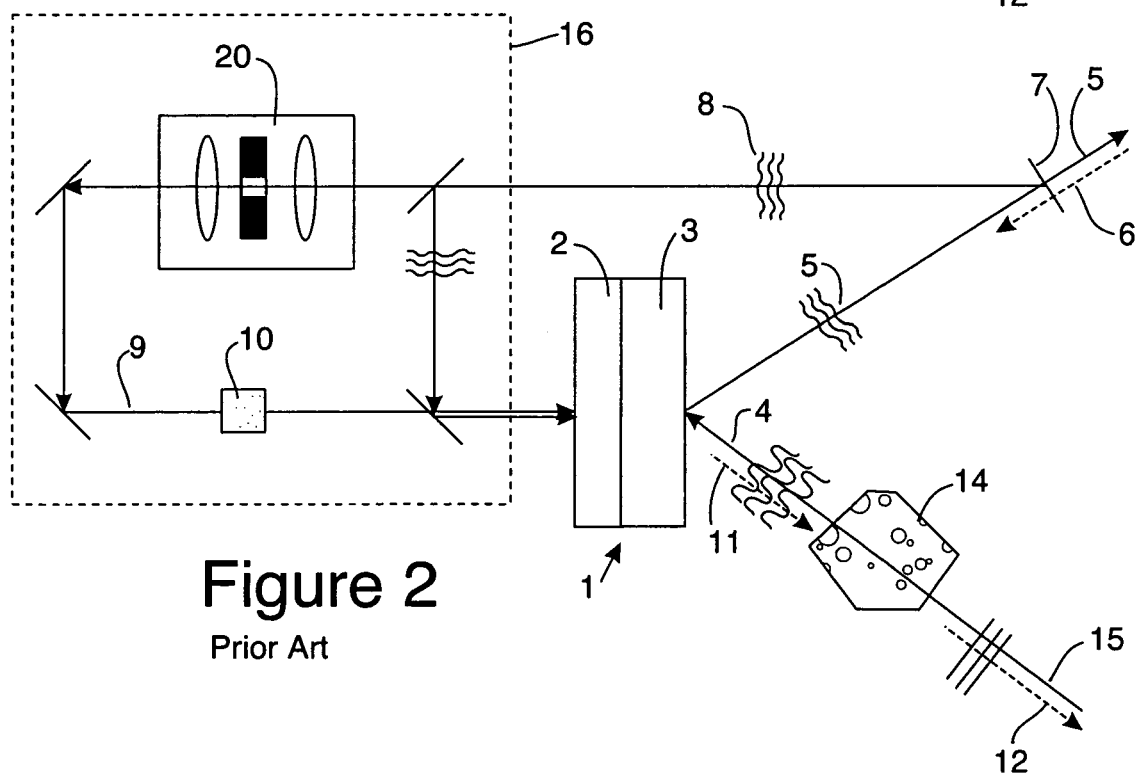
FIG. 2 is a schematic diagram of another example of an adaptive optical closed-loop self-referencing system of the prior art, this latter system having a spatial filter with an amplitude-stop fixed diameter pinhole for generating the local reference beam.

In order to overcome some of the limitations of the prior art, embodiment of the present invention preferably employ a phase-stop module 30 (see, e.g., FIG. 3) as the spatial filter for the self-referencing function, instead of the amplitude-stop fixed diameter pinhole 20 of FIG. 2.

Figure 3:
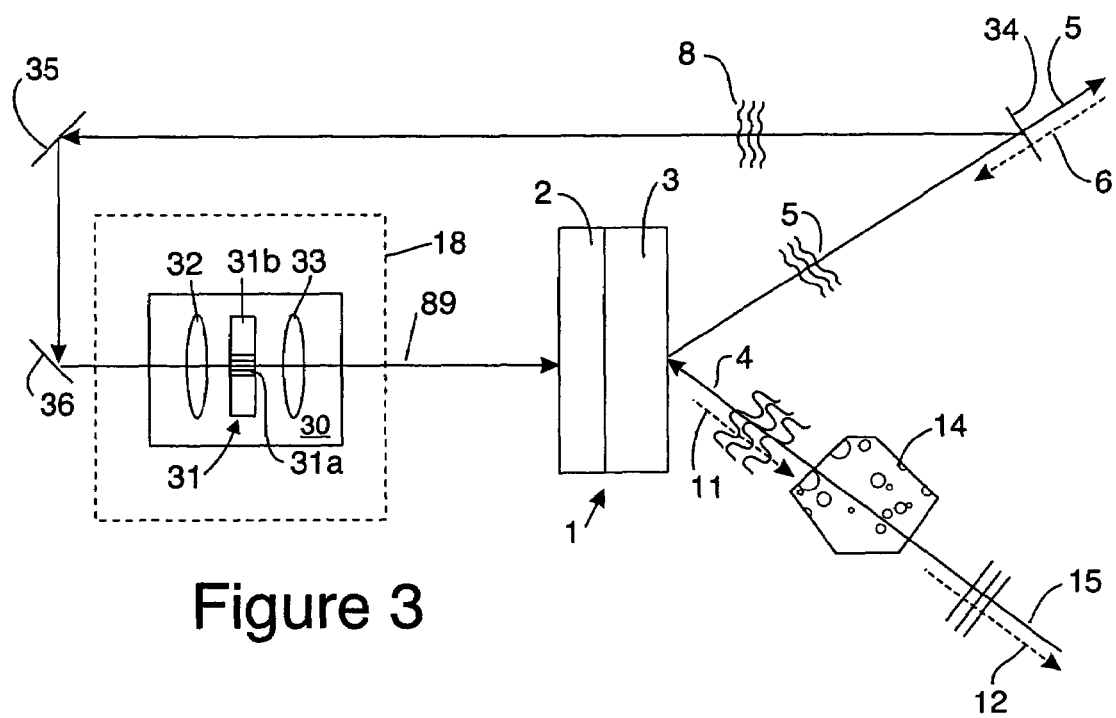
FIG. 3 is a schematic diagram of an embodiment of the present invention having an adaptive optical closed-loop self-referencing system having a phase-stop module for generating a combined local reference and external reference beam for producing an interferometric beam for the input port of the SLM.

An embodiment of the present invention is shown in FIG. 3. This embodiment preferably includes a phase-stop module 30, a beam splitter 34, mirrors 35 and 36, arranged as a common path interferometer 18, and an SLM 1 having a photoconductive input port 2 and a spatial phase output port 3. After reflection by the SLM 1, a portion 8 of an aberrated input beam 11 is diverted by beam splitter 34 and directed to the input of the phase-stop module 30, for example by mirrors 35 and 36. The phase-stop module 30 generates an interference fringe pattern representative of the wavefront error of the input beam 11 and outputs the fringe pattern to the photoconductive input port 2 of SLM 1. The spatial phase output port 3 of SLM 1 configures itself so as to compensate for the wavefront error sensed by the phase-stop module 30, and accordingly corrects the wavefront error of the input beam 11 upon reflection by the SLM 1.

In FIG. 3, the beam splitter is depicted as being downstream of SLM 1, so the feedback beam 8 reflects the aberration reduction effects of the SLM 1.

The phase-stop module 30 preferably includes a phase-stop interferometric module or plate 31 having a first region 31a and a second region 31b, the first region 31a being a "stop region" and the second region 31b being a "pass region". The phase-stop plate 31 is preferably positioned at a common focal plane of a pair of lenses 32, 33. Lenses 32, 33 preferably have identical focal lengths. A phase shift is imparted by the phase-stop interferometric module or plate 31 to a first portion of the external reference beam 8 which passes through the first region 31a thereof with the amount of the phase shift preferably being set to 90° relative to a second portion of the beam which passes through the second region 31b. The photons that pass through the stop region 31a of the phase-stop interferometric module 31 are of low spatial frequency content and can therefore be considered as being associated with a plane wave. Such photons (those passing through the stop region 31a) form the local reference beam. On the other hand, the photons that do not pass through the central phase-stop 31a, but propagate at greater diameters in the focal plane of the system, are of higher spatial frequencies and therefore pass through region 31b instead, and can thus be considered as being part of or reflecting the (aberrated) external reference, having a high spatial frequency content.

Figure 3A:
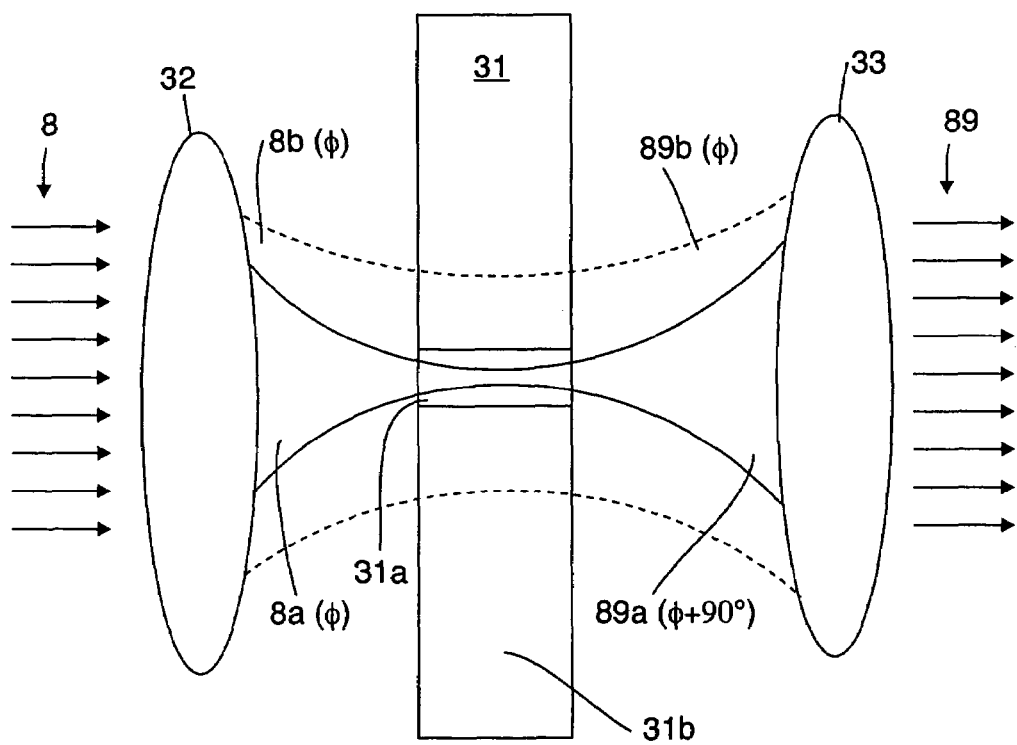
FIG. 3*a* is a detailed schematic view of an interferometric module of the phase-stop module, the interferometric module having a first region and a second region, the interferometric module selectively imparting a phase shift to light passing the first region compared to light passing the second region thereof.

FIG. 3a shows the beam 8 passing through the phase-stop interferometric module or plate 31. A portion 8a of the beam has little spatial frequency content and therefore it passes through the stop region 31a with preferably a 90 degree phase shift being imparted thereto. Another portion 8b of beam has higher spatial frequency content and, having a larger diameter, it passes through pass region 31b where little or no phase shift is applied thereto. A reference beam 89 exits plate 31 which beam 89 is basically equivalent to external and local reference beams 8, 9 of the prior art and therefore those components of beam 89, being in quadrature, efficiently interfere with each other to form an interference fringe pattern, which represents the wavefront error of the input beam 11 and which beam 89 is applied to input 2 of SLM 1 as the aforementioned interference pattern.

The phase-stop interferometric module 31 may be implemented in the form of, but is not limited to, a fixed diameter phase stop, as shown in the embodiment of FIG. 3, or one with a controllable diameter, such as an electro-optic thin film (e.g., a liquid crystal cell, E-O polymers, etc.) with transparent electrodes for radial control. Thus phase-stop interferometric module 31 may alternatively be implemented in the form of a SLM with a controllable phase region (which can be optically or electrically controlled), or in any other way known in the art to carry out the same function.

In contrast with the conventional amplitude spatial filter 20 discussed in connection with FIG. 2, in the system and method of the embodiment of the present invention of FIG. 3, most or all of the photons are utilized. Indeed, the phase-stop interferometric module 31 preferably substantially does not absorb any light, but instead, merely phase shifts different spatial frequency ranges of the wavefronts that pass through the phase-stop interferometric module 31. As a result, the performance of the system is improved as follows:

(1) The photon efficiency of the system is enhanced, since all or most of the photons incident upon the phase-stop interferometric module 31 are utilized in the generation of the desired fringe pattern for wavefront error sensing. This improves the signal-to-noise performance of the Wavefront Error Sensor (WES) (i.e., the phase-stop module 30) in terms of its shot-noise-limited detection of phase changes across the wavefront of the external reference beam. It follows that the system can properly function with lower incident optical intensities, thus enabling the system to compensate for weaker beams.

(2) The fringe visibility of the interference pattern is preferbly optimized since the phase shift imparted by the phase-stop interferometric module 31 is set to 90°, and thus the local and external reference beams are in quadrature.

In addition, the phase-contrast interferometric system of the embodiment of the present invention of FIG. 3 is a common-path interferometer (i.e., the local and external reference beams have substantially the same path), resulting in two additional benefits over the prior art:

(3) The device is basically impervious to vibration, since both the local and external reference beams traverse the same basic path; and (4) Since the path lengths of the local and external reference beams are essentially equal, very spectrally broadband light (i.e., "white light") can be used to generate the interference fringe pattern.

One of the possible control parameters for the system is the diameter of the stop region 31*a* of the phase-stop interferometric module 31. The diameter of the stop region 31*a* may be dynamically controlled using an optical sensor to preferably equalize the optical power passing through the phase stop region 31*a* and the optical power passing through the pass region 31*b* (i.e., preferably the same amount of optical energy passes through the first and second regions of the phase-stop interferometric module 31 to obtain more contrast in the fringe pattern). Dynamic control of the diameter of the stop region 31*a* adds complication (since a control system for controlling the aperture size of the stop region 31*a* is then needed), but since the benefits are believed to outweigh these complications, dynamic control is preferred for most applications. As will be seen, the embodiment of FIG. 4 utilizes a dual-channel optical power detector 57 to equalize the power of the equivalent local reference and the power of the high-spatial-frequency equivalent external reference as detected by two detectors 55 and 56 associated with a secondary phase-stop module 50 which divides the equivalent local reference photons and the high-spatial-frequency equivalent external reference photons into two channels.

Another way of dynamically controlling the aperture size of the stop region 31*a* is to maximize the fringe visibility of the fringe pattern that exits the phase-stop module 30 (fringe visibility is improved by increasing the contrast of the dark to bright fringes and this can be accomplished according to the embodiment to be discussed with reference to FIG. 5).

In either embodiment (FIG. 4 or 5), the result of the operation is to maximize the fringe contrast of the interference pattern (with a tradeoff in terms of the spatial frequency content of the local reference). As convergence of the closed-loop system is approached the residual external reference wavefront error decreases, and the diameter of the phase-stop region 31*a* can be decreased. This operation enables the local reference to approach a planar wavefront, with adequate fringe visibility. When the system is initialized, the diameter of region 31*a* is preferably set to a predetermined value such as a setting where equal amounts of light pass through regions 31*a* and 31*b*.

Yet another possible control parameter is the magnitude of the phase-stop, and its adjustment around the optimal value of 90°.

With these two servo-control control parameters, i.e., the diameter of the phase stop and the magnitude of the phase shift, millions of equivalent piston actuators of the SLM 1 may be controlled.

An optional processor 40 may be used to control the diameter region 31*a* of the phase-stop and the magnitude of the phase shift imparted by the phase-stop module 30.

Figure 5:
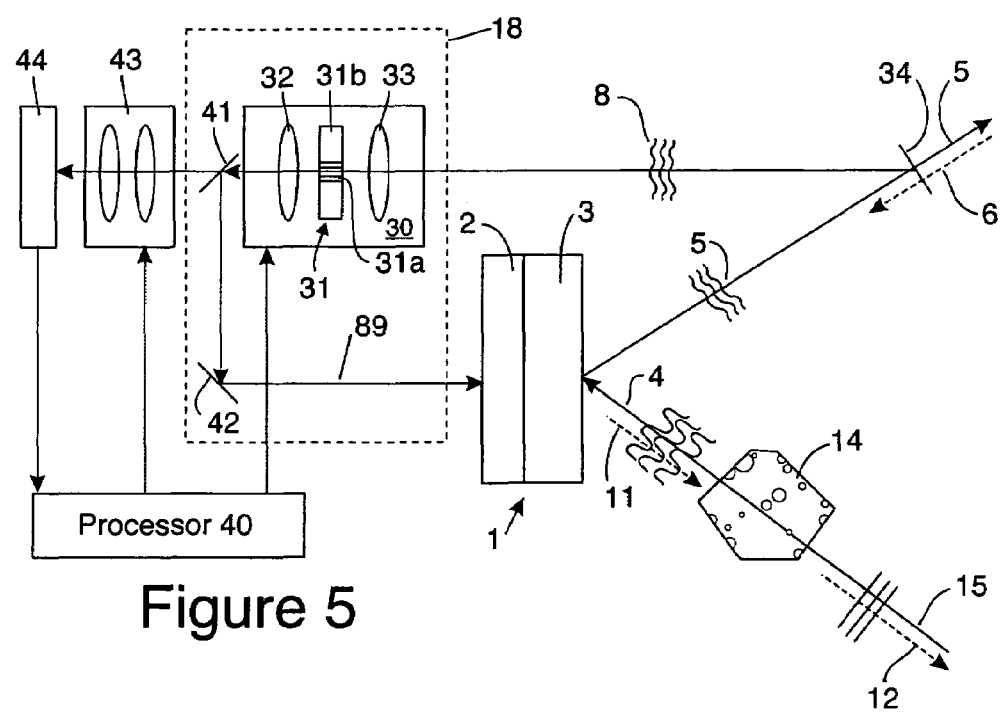
FIG. 5 is a schematic diagram of another embodiment of the present invention having an adaptive optical closed-loop self-referencing system having a phase-stop module for generating a combined local reference and external reference beam for producing an interferometric beam for the input port of the SLM and which utilizes an imaging device to increase the contrast ratio of the fringe pattern.

The embodiment of FIG. 5 preferably utilizes a processor 40 to control the diameter of region 31*a*. In this embodiment, a small fraction of the beam is preferably sampled after passage through the phase-stop module 30, and prior to impinging on the photoconductor input port 2 of the SLM 1. This is preferably realized with a beam splitter 41 which transmits the small fraction of beam 89 and directs a major portion of the beam to photoconductive input port 2 via an optical path 89 that, in this embodiment, includes mirror 42.

Figure 6:
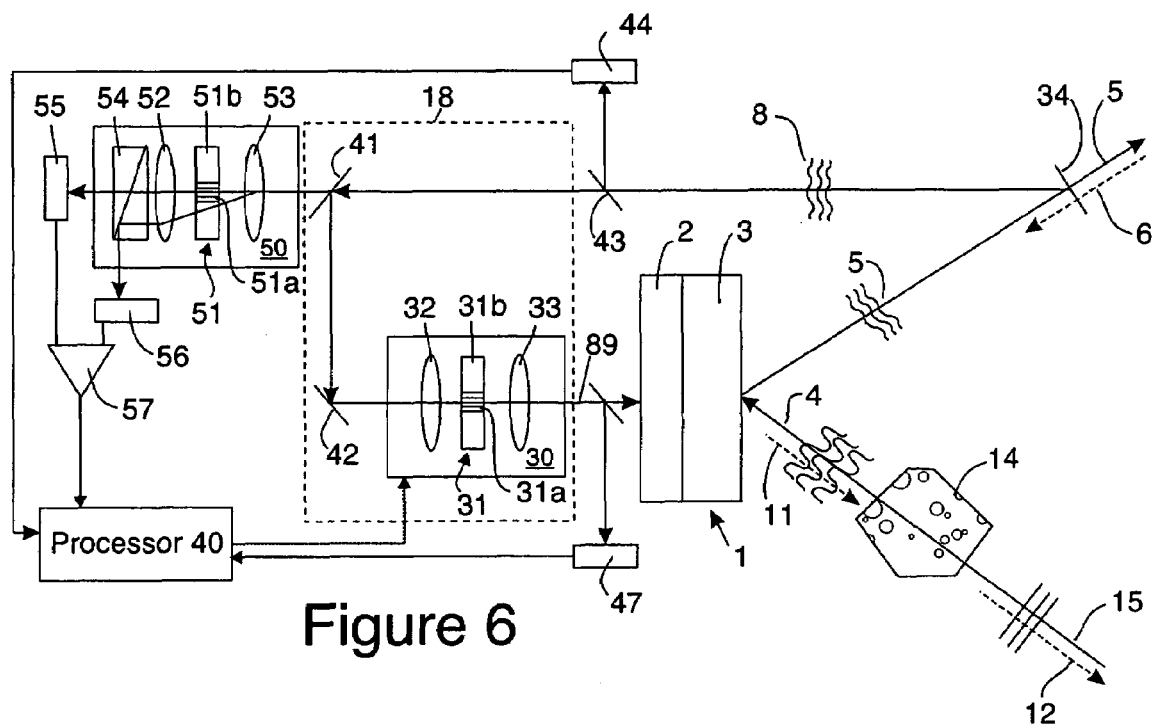
FIG. 6 is similar to FIG. 5, but further includes a CCD/video camera and a video processor to obtain far-field information about the external reference beam.

An optical interference pattern is obtained in the plane of photoconductor input port 2 as a result of the phase-contrast operation of the phase-stop module 30. The interference pattern represents a near-field mapping of the wavefront residual error. As part of the closed-loop system, an optical relay module 43 is preferably used to image the small fraction of beam 89 transmitted by beam splitter 41 onto a video camera 44 having a CCD detector array or equivalent. The optical relay module 43 preferably comprises optical devices for relaying the beam such as lenses, mirrors, diffractive optics, etc., and may also include a magnification lens (to properly image and address the SLM) and/or a transform lens (to provide Strehl ratio information). The CCD array outputs an electrical signal representative of the fringe pattern, which signal is transmitted to processor 40 which may be implemented by a commercial video processor. Initially, the function of processor 40 is to ascertain the fringe visibility (i.e., the contrast level) of the optical interference pattern sensed by the video camera/CCD array 44. Another important function of processor 40 is to servo-control the phase-stop diameter of phase-stop (region 31*a*) interferometric module 31 in order to maximize the fringe contrast. In an initial search mode, the diameter of the phase-stop may first be set to a diffraction-limited value (approximately $f_{\#}\lambda$, where $f_{\#}$ is the f stop and $\lambda$ is the nominal wavelength) and then increased until the fringe contrast is maximized. As the closed-loop system begins to converge, the diameter of the phase-stop (region 31*a*) is preferably driven back to a value near its initial diffraction-limited diameter. As shown in FIG. 6, a second CCD array 44 is used to measure the two-dimensional far-field pattern of the corrected beam. Array 44 is preferably located at the focal plane of a lens (not shown). This optional diagnostic parameter may also be fed back to processor 40 of this embodiment, if desired.

Figure 4:
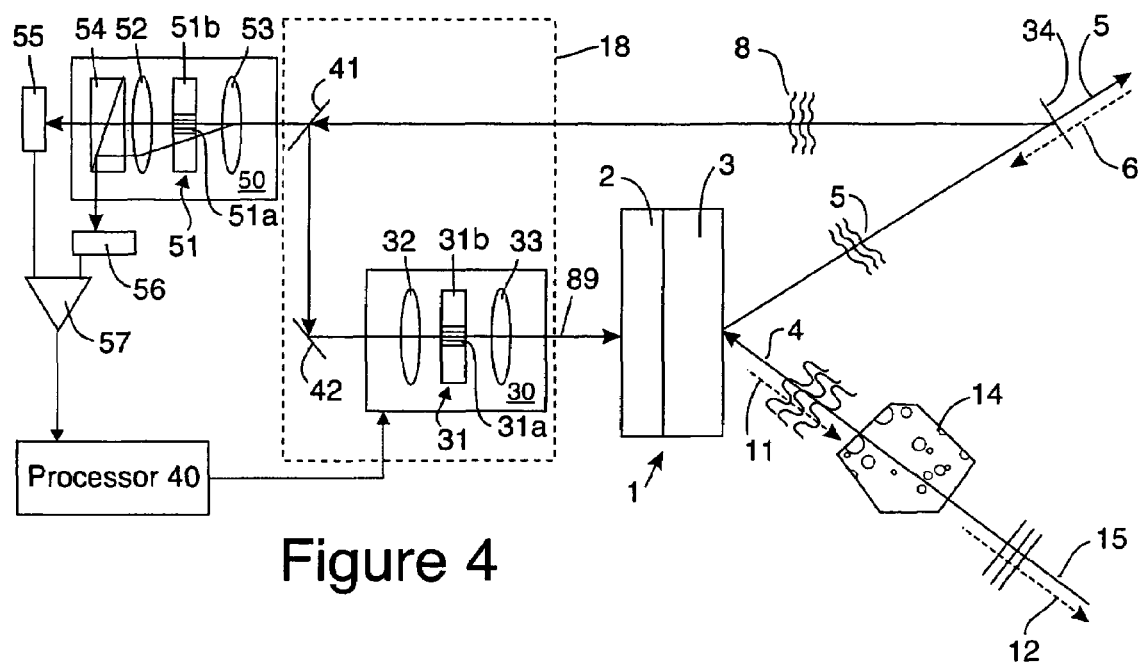
FIG. 4 is a schematic diagram of another embodiment of the present invention having an adaptive optical closed-loop self-referencing system having a phase-stop module for generating a combined local reference and external reference beam for producing an interferometric beam for the input port of the SLM and which utilizes an imaging device to increase the contrast ratio of the fringe pattern, the imaging device including a polarization-stop module.

In another approach, the necessary optical measurements to be provided as inputs to processor 40, may be obtained with a dual-channel optical power detector 57, as shown in FIG. 4. The primary function of optical power detector 57 is to balance the optical power that passes through the phase-stop (through region 31*a*) relative to the power that propagates around the phase-stop (i.e. through region 31*b*) to thereby balance between power level of the equivalent external and local reference beams in beam 89. Once these two power levels are matched, the fringe visibility is, by definition, maximized.

There are several techniques by which this operation can be accomplished. In the embodiment of FIG. 4, a secondary phase-stop module 50 is used to sample the beam prior to its passage through the primary phase-stop module 30 as it exits beam splitter 41. The secondary phase-stop module 50 preferably comprises a polarization-stop interferometric element 51 with preferably the same pinhole diameter control as the phase-stop interferometric element 31 of the primary phase-stop module 30. However, instead of modifying the phase of the central portion 51*a* of the beam, the polarization of the central portion 51*a* of the beam is preferably rotated by 90°. Thus, the central portion 51*a* of the beam which passes through the pinhole stop of the polarization-stop interferometric module 51, preferably has its polarization made to be substantially orthogonal to the polarization of the portion 51*b* of the beam 8 which does not pass through the pinhole stop (i.e. the portion of the beam passing though portion 51*b*). In other words, the polarization-stop interferometric module 51 outputs a first beam and a second beam, the polarization of the first beam being rotated by 90° relative to the polarization of the second beam, with the first beam being relatively free of higher spatial frequency components and the second beam basically comprising the higher spatial frequency components.

Preferably, the secondary phase-stop module 50 includes a polarization beam splitter 54 following the polarization-stop interferometric element 51 which is preferably disposed between a pair of lenses 52, 53. The primary function of the polarization beam splitter 54 is to direct incident beams having different polarizations into different directions, and may be, for example, in the form of a Glan prism or another polarization beam splitter known on the art, for example, polymer-based devices and thin-film devices, etc. After passage through the polarization beam splitter 54, the first beam is preferably received by a first differencing detector 55, while the second is preferably received by a second differencing detector 56. The outputs of both differencing detectors are preferably directed to a dual-channel optical power detector 57, the output of which is sent to processor 40. The processor 40 determines the power difference between the first and second beams and in turn uses this information to control the phase-stop module 30 so that the power difference between the local and external reference beams generated by the phase-stop interferometric module 30 is kept at a minimal value, preferably near zero. In other words, the closed-loop system of FIG. 4 substantially equalizes the low spatial frequency components (carried by the first beam) and the higher spatial frequency components (carried by the second beam) of the external reference beam. Both of these beams (the so-called first beam and the so-called second beam) appear together as beam 89.

The embodiment of FIG. 4, for example, can be modified to add a video camera/CCD imaging device 44 to provide still further information as shown in FIG. 6. Imaging device 44 samples beam 8 by means of a beam splitter 43. The video processor 45 can aid in the improvement of the fringe contrast ratio by measurement of the residual phase error in the far field as sampled by imaging device 44.

Optionally, another camera/CCD imaging device 47 in combination with processor 40 can be used, either alternatively or in 10 combination with the improvements mentioned above with reference to FIG. 6, to the aid in the improvement of the fringe contrast ratio by measurement of the residual phase error in the near field as sampled by an imaging device 47 which samples beam 89.

The embodiments of FIGS. 4, 5 and 6 all utilize common path interferometers 16 and therefore enjoy the benefits of that interferometer type, as is discussed above.

Figure 7:
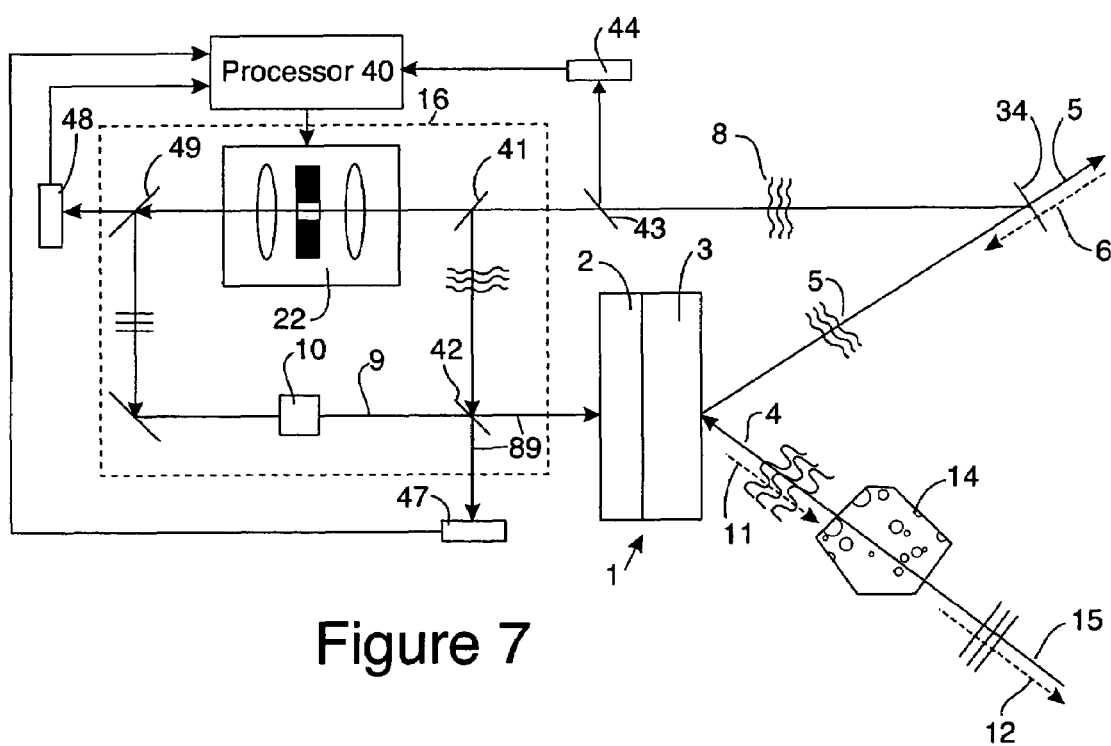
FIG. 7 is a schematic diagram of another embodiment of the present invention having an adaptive optical closed-loop self-referencing system having a variable amplitude-stop module for generating a combined local reference and external reference beam for producing an interferometric beam for the input port of the SLM and which utilizes an imaging device to increase the contrast ratio of the fringe pattern by adjusting the diameter of the amplitude-stop.

FIG. 7 depicts an embodiment which utilizes an amplitude stop 22 of dynamically controllable diameter arranged as a Mach-Zehnder interferometer 16. The diameter of the stop is controlled by a processor 40 which is responsive to both the wavefront error signal 8 (the far field residual phase error) and the combined external and local reference beams 89 (the near field residual phase error). The far field residual phase error is sampled by a beam splitter 43 and an imaging device 44, similar to the embodiment of FIG. 6. The near field residual phase error is sampled by a beam splitter/combiner 42 and an imaging device 47, again similar to the embodiment of FIG. 6. To form the interference pattern in beam 89, which beam is formed by beam splitter/combiner 42, an optical phase shifter 10 is placed in the output leg 9 of amplitude stop 22 upstream of beam splitter/combiner 42, for quadrature operation of the Mach-Zehnder interferometer 16.

Optionally, the output of the amplitude stop 22 can be sampled by a beam splitter 49 and a power measuring detector 48, in order to equalize the power in the near and far fields similar to the embodiments of FIGS. 4 and 6. In such an embodiment, sensor 44 would integrate the image to determine the total power in the incoming beam.

Figure 8:
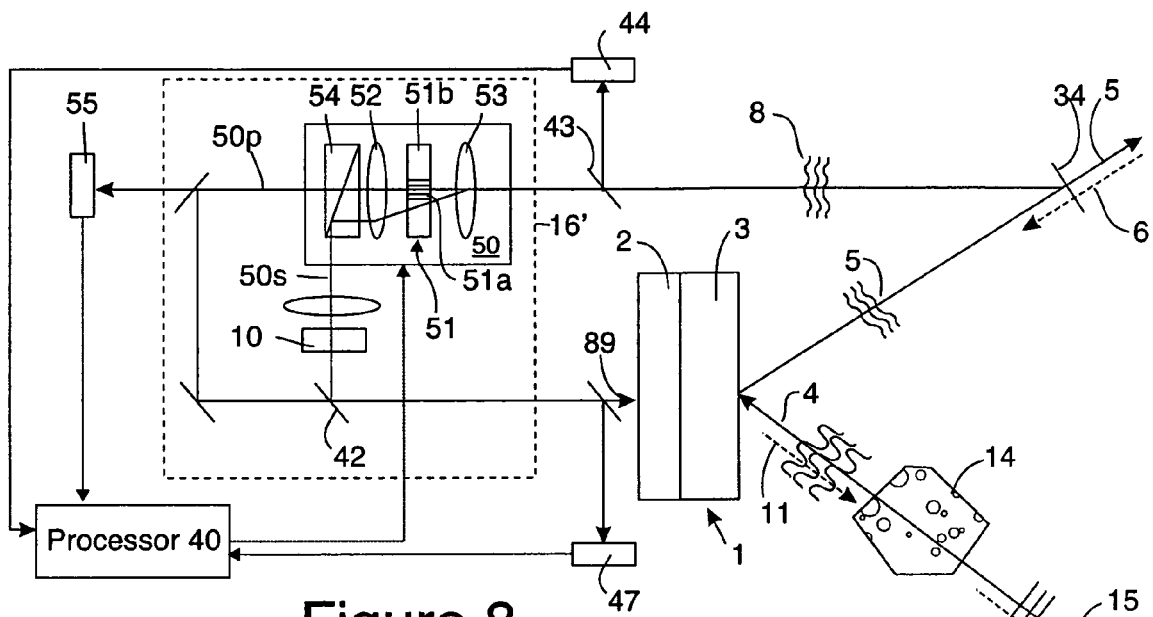
FIG. 8 is a schematic diagram of an embodiment of the present invention having an adaptive optical closed-loop self-referencing system having a polarization-stop module for generating the combined local reference and external reference beam for producing an interferometric beam for the input port of the SLM.

FIG. 8 depicts a closed-loop system which provides an effective amplitude stop using polarization decoupling. Polarization decoupling is accomplished by means of a polarization-stop interferometric module 50, which is more photon efficient than the pure amplitude stop such as provided by element 22 of FIG. 7. The amplitude blocks at least some of the light which impinges stop 22. The polarization stop passes all the light which impinges it (assuming, of course, that it were 100% efficient), therefore is more photon efficient in terms of utilizing the light in the feed back beam 8. The polarization-stop interferometric module 50 separates the low spatial frequency components (carried by the so-called first beam as port 50s) by rotating their polarization relative to the higher spatial frequency components (carried by the so-called second beam at port 50p). Both of these beams (the so-called first beam and the so-called second beam) appear together as beam 89 after being combined at a beam combiner 42. To form the interference pattern in beam 89, which beam is formed by beam combiner 42, an optical phase shifter 10 is placed in the output leg 50s of polarization-stop interferometric module 50 upstream of beam combiner 42, for quadrature operation of the interferometer.

Figure 9:
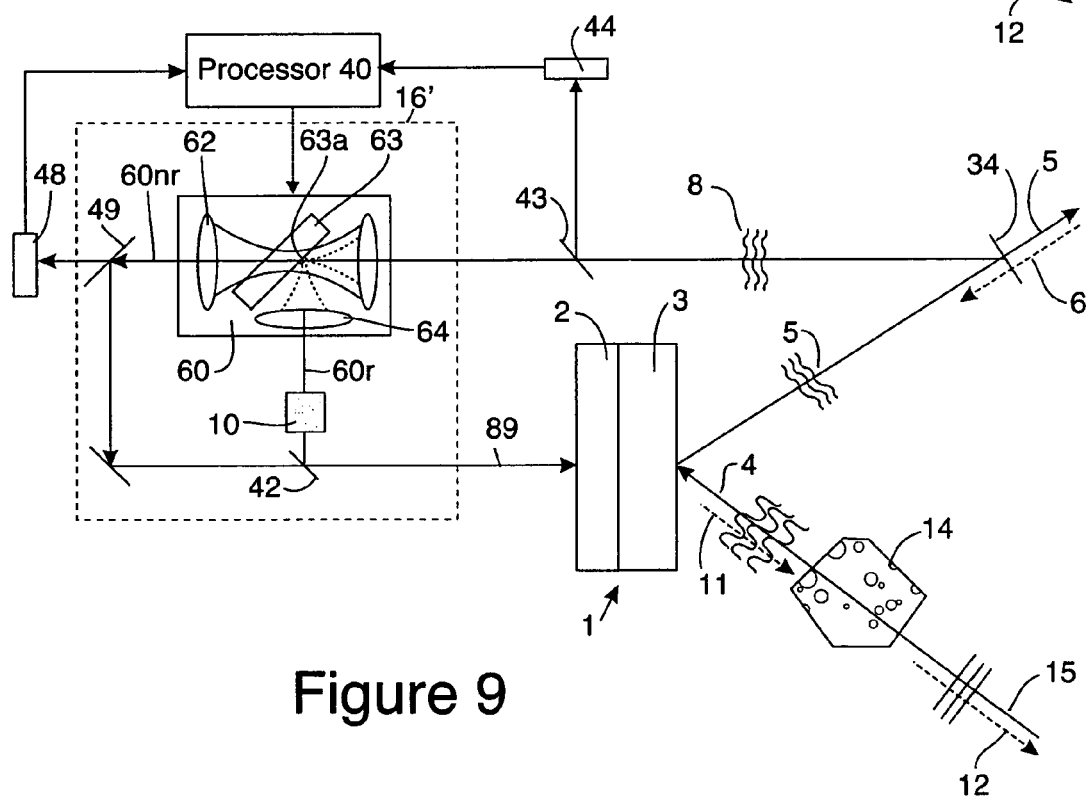
FIG. 9 is a schematic diagram of an embodiment of the present invention having an adaptive optical closed-loop self-referencing system having a reflection-stop module for generating the combined local reference and external reference beam for producing an interferometric beam for the input port of the SLM.

FIG. 9 depicts yet another embodiment of the present invention. In this embodiment, a reflection-stop interferometric module 60 is utilized. Instead of utilizing a phase changing or polarization change effect in the aperture of the stop 63, the so-called first beam having low spatial frequency components is reflected from a reflecting surface 63a of the stop 63 towards a lens 64 and port 60r while the so-called second beam having the high spatial frequency components passes unaffected through stop 63 to a lens 62 and port 60nr. The first beam having low spatial frequency components and the second beam having the high spatial frequency components appear together as beam 89 after being combined at a beam combiner 42. To form the interference pattern in beam 89, an optical phase shifter 10 is placed in the output leg 60r of reflection-stop interferometric module 60 upstream of beam combiner 42, for quadrature operation of the interferometer.

Optionally, a processor 40 can be utilized to control the aperture of reflecting surface 63a. The processor can use several pieces of information, such as (i) detection of the far field residual phase error using detector 44 and beam splitter 43; (ii) detection of the power of the second beam using detector 48n and beam splitter 49; or (iii) detection of the near field residual phase error using detector 47 (see FIG. 7) and by making beam combiner 43 also function as a splitter. Detector option (iii) is not depicted by FIG. 9, but the preferred elements are shown in FIG. 7.

In yet another embodiment, both the phase-stop operation and the polarization tagging operation may be carried out with a single time-multiplexed interferometric module. Consider FIGS. 4 and 6, noting that modules 30 and 50 are in many ways similar to each other. Instead of providing two such modules in an embodiment of the invention, a single interferometric module could instead be provided which would be utilized during certain parts of the time as a sensor (like module 50) and during other parts of the time as phase-stop module (like module 30). A high-speed electro-optic cell (e.g., a ferro-electric liquid crystal or polymer) may be used to facilitate this switching of the mode (sensing or phase-stopping) of operation of the single interferometric module. The duty cycle is preferably set to optimize the performance of the overall system, since the SLM 1 requires most of the photons to drive the large number of equivalent actuators, whereas the phase-stop controller requires just two measurements to be made (the balancing of the equivalent local and external reference beam power levels).

The embodiments of FIG. 4, 5 and 6 are preferred in that they all provide one means or another of controlling the size of aperture 31a of the phase-stop interferometric module 30 of FIG. 3 and due to the fact that they utilize a common path interferometer 16 which provides the additional benefits discussed above. FIG. 8 depicts an alternative embodiment to that of FIG. 3. Instead of utilizing a phase-stop interferometric module 30, a polarization-stop interferometric module 50 is used instead together with an optical phase shifter 10 arranged as a quasi Mach-Zehnder interferometer 16'. While the embodiment of FIG. 3 is preferred compared to that of FIG. 8 (the embodiment of FIG. 3 is less complex than that of FIG. 8), the modifications to FIG. 3 provided by the embodiments of FIG. 4-6 could also be applied to the embodiment of FIG. 8.

The embodiments of FIGS. 8 an 9 both utilize what I call a quasi Mach-Zehnder interferometer 16' in that two legs exit the interferometric module 50, 60, with a phase shifter 10 in one of the two legs. In both of the embodiments of FIGS. 8 and 9, substantially all of the light available that is diverted by splitter 34 is made available to the interferometric module 50, 60, as opposed a part of the light being routed around an interferometric module as in the case of the prior art of FIG. 2 and the Mach-Zehnder embodiment of FIG. 7. Since the interferometer 16' of FIGS. 8 and 9 does not have the classic configuration of a Mach-Zehnder interferometer, but still uses a phase shifter 10 in one of its two legs. I have chosen to call this arrangement a quasi Mach-Zehnder interferometer.

FIG. 9 depicts another alternative embodiment to that of FIG. 3. Instead of utilizing a phase-stop interferometric module 30, a reflection-stop interferometric module 60 is used instead together with an optical phase shifter 10. While the embodiment of FIG. 3 is preferred compared to that of FIG. 9 (the embodiment of FIG. 3 is less complex than that of FIG. 9), the modifications to FIG. 3 provided by the embodiments of FIGS. 4-6 could also be applied to the embodiment of FIG. 9 (some of the possible detection schemes are already depicted by FIG. 9).

All of these embodiments (of FIGS. 3–6, 8 and 9) share a common attribute: all or essentially all of the light available in path 8 is returned to the photoconductor input port 2 of SLM 1. A small amount of light is lost in the various detectors, but having detectors allows for the dynamic sizing of apertures 31a, 51a, 61a and is believed to be a worthwhile tradeoff. All of these embodiments are photonically much more efficient than is the prior art.

FIG. 7 represents the least desirable improvement over the prior art. FIG. 7 does have the advantage of dynamic sizing of aperture 31a which should improve the ability of SLM 1 to reduce the aberrations in reflected beam 5, which advantage is shared with a number of other disclosed embodiments. But the embodiment of FIG. 7 is less photonically efficient than are the embodiments of FIGS. 3–6, 8 and 9.

Having described this invention in connection with a number of embodiments, modification will now certainly suggest itself to those skilled in the art. As such, the invention is not to be limited to the disclosed embodiments except as required by the appended claims.

What is claimed is:

1. A system for wavefront aberration reduction of an incident optical beam, the system including:
   a spatial light modulator for receiving the incident optical beam and forming an output optical beam, the output beam being aberration-reduced compared to the incident beam; and
   an interferometer for receiving a sampled portion of the output optical beam and for generating an interference fringe pattern by introducing a phase shift to one part of said sampled portion of the output optical beam, the interference fringe pattern being applied to said spatial light modulator and comprising essentially all of the light available in said sampled portion of the output optical beam;
   wherein the interference fringe pattern is representative of wavefront error of the incident optical beam and the interference fringe pattern activates said spatial light modulator such that said spatial light modulator performs wavefront error correction on the output optical beam.

2. The system of claim 1, wherein the interferometer comprises an interferometric module, said interferometric module including:
   (i) a stop region thereof for receiving a first portion of the sampled portion of the output optical beam; and
   (ii) a pass region thereof for receiving a second portion of the sampled portion of the output optical beam;
   wherein said first portion is changed by the stop region while said second portion passes through the pass region substantially unaffected.

3. The system of claim 2 wherein said first portion is changed by the stop region either (i) imparting a phase shift thereto; (ii) imparting a polarization change thereto; or (iii) imparting a direction change thereto.

4. The system of claim 2, wherein said first portion interferes with said second portion to form an interference fringe pattern.

5. The system of claim 2, wherein the spatial light modulator comprises (i) a photoconductor input port and (ii) a spatial phase output port adjacent the photoconductor input port, wherein the photoconductor input port receives the interference fringe pattern from the interferometer and addresses the spatial phase output port, and wherein the spatial phase output port performs wavefront error correction on the incident optical beam.

6. The system of claim 2, wherein the second optical beam is phase shifted by 90° relative to the second optical beam.

7. The system of claim 2 further comprising a beam splitter disposed in a light path of the output optical beam for sampling the output optical beam to form the sampled portion of the output optical beam by diverting said sampled portion of the output optical beam and transmitting a second portion of the output optical beam.

8. The system of claim 1 further including an opto-electric control apparatus for increasing a contrast of the interference fringe pattern.

9. The system of claim 8, wherein the opto-electric control apparatus comprises a polarization-stop interferometric module, said polarization-stop interferometric module including:
   (i) a stop region thereof for receiving a first portion of the sampled portion of the output optical beam; and
   (ii) a pass region thereof for receiving a second portion of the sampled portion of the output optical beam;
   wherein said first portion is imparted a polarization shift upon transmission by the stop region while said second portion passes through the pass region substantially unaffected.

10. The system of claim 8, wherein the interferometer comprises a phase-stop interferometric module, said phase-stop interferometric module including:
   (i) a stop region thereof for receiving a first portion of the sampled portion of the output optical beam; and (ii) a pass region thereof for receiving a second portion of the sampled portion of the output optical beam;
wherein said first portion is imparted a phase shift upon transmission by the stop region while said second portion passes through pass region substantially unaffected.

11. The system of claim 10, wherein said first portion interferes with said second portion to form said interference fringe pattern.

12. The system of claim 10, wherein the spatial light modulator comprises (i) a photoconductor input port and (ii) a spatial phase output port adjacent the photoconductor input port, wherein the photoconductor input port receives the interference fringe pattern from the interferometer and addresses the spatial phase output port, and wherein the spatial phase output port perform wavefront error correction on the incident optical beam.

13. The system of claim 10, wherein said first portion is phase shifted by 90° relative to said second portion.

14. The system of claim 10 further comprising a beam splitter disposed in a light path of the output optical beam for sampling the output optical beam to form the sampled portion of the output beam by diverting said sampled portion of the output optical beam and transmitting a second portion of the output optical beam.

15. The system of claim 8, wherein the interferometer comprises a reflection-stop interferometric module, said reflection-stop interferometric module including:
(i) a stop region thereof for receiving a first portion of the sampled portion of the output optical beam; and
(ii) a pass region thereof for receiving a second portion of the sampled portion of the output optical beam;
wherein said first portion is imparted a direction change upon reflection by the stop region while said second portion passes through the pass region substantially unaffected.

16. The system of claim 1 wherein the interferometer is a common path interferometer.

17. The system of claim 1 wherein the interferometer is a Mach-Zehnder interferometer.

18. The system of claim 1 wherein the interferometer is a quasi Mach-Zehnder interferometer.

19. The system of claim 1, wherein the interferometer comprises a reflection-stop interferometric module, said reflection-stop interferometric module including:
(i) a stop region thereof for receiving a first portion of the sampled portion of the output optical beam; and
(ii) a pass region thereof for receiving a second portion of the sampled portion of the output optical beam;
wherein said first portion is imparted a direction change upon reflection by the stop region while said second portion passes through the pass region substantially unaffected.

20. A system for wavefront aberration reduction of an incident optical beam, the system including:
a spatial light modulator for receiving the incident optical beam and forming an output optical beam, the output beam being aberration-reduced compared to the incident beam;
an interferometer for receiving a portion of the output optical beam and for differentiating said portion into first and second beams, the interferometer having a dynamically controllable aperture;
a phase shift apparatus for introducing a phase shift to one of said first and second beams which beams generate an interference fringe pattern which is applied to said spatial light modulator; and a control system for dynamically controlling the size of the aperture of the interferometer in order to reduce the amount of aberration in the output optical beam;
wherein the interference fringe pattern is representative of the wavefront error of the incident optical beam and the interference fringe pattern activates said spatial light modulator such that said spatial light modulator performs wavefront error correction on the output optical beam.

21. The system of claim 20 wherein light passing through the aperture in the interferometer is phase-shifted relative to light passing the interferometer externally of said aperture.

22. The system of claim 20 wherein light passing through the aperture in the interferometer is polarization-shifted relative to light passing the interferometer externally of its aperture and further including a polarization beam splitter to separate the first and second beams, a phase shifter for imparting a phase shift to one of the first and second beams and a beam combiner for recombining the first and second beams after one of the first and second beams has been phase shifted by said phase shifter.

23. A system for wavefront aberration reduction of an incident optical beam, the system comprising:
a spatial light modulator for receiving the incident optical beam and forming an output optical beam, the output beam being aberration-reduced compared to the incident beam;
an interferometer for receiving a portion of the output optical beam and for differentiating said portion into first and second beams, the interferometer having a dynamically controllable aperture or reflective surface;
a phase shift apparatus for introducing a phase shift to one of said first and second beams which beams generate an interference fringe pattern which is applied to said spatial light modulator; and
a control system for dynamically controlling the size of the aperture or reflective surface of the interferometer in order to reduce the amount of aberration in the output optical beam;
wherein the interference fringe pattern is representative of the wavefront error of the incident optical beam and the interference fringe pattern activates said spatial light modulator such that said spatial light modulator performs wavefront error correction on the output optical beam.

24. The system of claim 23 wherein the interferometer is a common path interferometer.

25. The system of claim 23 wherein the interferometer is a Mach-Zehnder interferometer.

26. The system of claim 23 wherein the interferometer is a quasi Mach-Zehnder interferometer.

27. A method for wavefront aberration reduction of an incident optical beam, the method including the steps of:
receiving the incident optical beam at a spatial light modulator and forming an output optical beam, the output beam being aberration-reduced compared to the incident beam;
directing a portion of the output optical beam to interferometer for differentiating said portion into first and second beams, said interferometer having a dynamically controllable aperture;
introducing a phase shift to one of said first and second beams;
generating an interference fringe pattern which is applied to said spatial light modulator; and dynamically controlling the size of the aperture of the interferometer to reduce the amount of aberration in the output optical beam;

wherein the interference fringe pattern is representative of the wavefront error of the incident optical beam and the interference fringe pattern activates said spatial light modulator such that said spatial light modulator performs wavefront error correction on the output optical beam.

28. The method of claim 27 wherein light passing through the aperture in the common-path interferometer is phase-shifted relative to light passing the interferometer externally of said aperture.

29. The method of claim 27 wherein light passing through the aperture in the interferometer is polarization-shifted relative to light passing the interferometer externally of its aperture and further including the steps of separating the first and second beams, imparting a phase shift to one of the first and second beam, recombining the first and second beams after one of the first and second beams has been phase shifted, the recombined beams forming the interference fringe pattern.

30. A method for wavefront aberration reduction of an incident optical beam, the method including the steps of:

receiving the incident optical beam at a spatial light modulator for and forming an output optical beam, the output beam being aberration-reduced compared to the incident beam;

receiving a portion of the output optical beam at a interferometer for differentiating said portion into first and second beams, the interferometer having a dynamically controllable aperture or reflective surface;

introducing a phase shift to one of said first and second beams which beams generate an interference fringe pattern which is applied to said spatial light modulator; and a control system for dynamically controlling the size of the aperture or reflective surface of the interferometer in order to reduce the amount of aberration in the output optical beam;

wherein the interference fringe pattern is representative of the wavefront error of the incident optical beam and the interference fringe pattern activates said spatial light modulator such that said spatial light modulator performs wavefront error correction on the output optical beam.

* * * * *